(12) United States Patent
Wu (10) Patent No.: US 8,714,039 B2
(45) Date of Patent: May 6, 2014

(54) STROKE-RESTRICTING DEVICE OF LINEAR ACTUATOR AND WIRE-REELING MECHANISM THEREOF

(75) Inventor: Chou-Hsin Wu, New Taipei (TW)

(73) Assignee: Timotion Technology Co., Ltd., New Taipei (TW)

( * ) Notice: Subject to any disclaimer, the term of this patent is extended or adjusted under 35 U.S.C. 154(b) by 568 days.

(21) Appl. No.: 13/083,545

(22) Filed: Apr. 9, 2011

(65) Prior Publication Data
US 2012/0255380 A1    Oct. 11, 2012

(51) Int. Cl.
*F16H 25/12*    (2006.01)
(52) U.S. Cl.
USPC ........................................ 74/89.37; 74/89.33
(58) Field of Classification Search
USPC .............................................. 74/89.23–89.45
See application file for complete search history.

(56) References Cited

U.S. PATENT DOCUMENTS

| | | | |
|---|---|---|---|
| 1,644,545 A * | 10/1927 | Robertson | 318/282 |
| 3,150,843 A | 9/1964 | Cordoba et al. | |
| 5,762,281 A | 6/1998 | Foley | |
| 2007/0181730 A1 | 8/2007 | Yen | |

FOREIGN PATENT DOCUMENTS

| | | |
|---|---|---|
| DE | 2810745 C2 | 6/1979 |
| DE | 102005025748 A1 | 12/2006 |
| EP | 1420504 A1 | 5/2004 |

OTHER PUBLICATIONS

Deutsches Official Action issued on Jun. 1, 2012.

* cited by examiner

*Primary Examiner* — David M Fenstermacher
*Assistant Examiner* — Terence Boes
(74) *Attorney, Agent, or Firm* — Chun-Ming Shih; HDLS IPR Services (57) ABSTRACT

The present invention relates to a stroke-restricting device of a linear actuator and a wire-reeling mechanism thereof. The linear actuator includes a base and a telescopic pipe. The stroke-restricting device includes a box, a movable member, a block, a pair of switches, and a wire-reeling mechanism. The box is fixed to the base and has a wall plate. The wall plate is provided with a through-hole. The movable member includes a rod penetrating the through-hole and movable with respect to the box. The block is fixed to the rod. The pair of switches is fixed to the box to correspond to the block. Each of the switches has a trigger portion for generating electrical signals by means of contact of the block. Each of the trigger portions is located at two opposite ends of a moving path of the block. The wire-reeling mechanism includes a wire disposed in the telescopic pipe and moving therewith. One end of the wire is connected to the movable member. By this structure, only a small space can be used to control a limit position of a long distance.

18 Claims, 8 Drawing Sheets

STROKE-RESTRICTING DEVICE OF LINEAR ACTUATOR AND WIRE-REELING MECHANISM THEREOF

FIELD OF THE INVENTION

The present invention relates to a linear actuator, in particular to a stroke-restricting device of a linear actuator and a wire-reeling mechanism thereof.

BACKGROUND OF THE INVENTION

Various different types of linear actuators are available in the market, and there is one type of linear actuators, wherein an electric motor and an outer pipe are installed on a base, and a lead screw is installed onto the base and electrically driven and rotated by the electric motor. In addition, the lead screw includes a telescopic pipe installed at the exterior of the lead screw, and an outer pipe sheathed on the exterior of the telescopic pipe, and an end of the outer pipe is fixed to the base, such that the telescopic pipe can be driven by the electric motor to move the lead screw linearly back and forth in an axial direction with respect to the outer pipe. However, users cannot know whether or not the telescopic pipe has moved to the end of the stroke when the linear actuator is operated, but the telescopic pipe is operated continuously even when the telescopic pipe has moved to the end of the stroke, and thus the linear actuator may be damaged easily.

To overcome the aforementioned problem, related manufacturers have developed a linear actuator with a stroke-restricting device, wherein a switch is installed at both ends of the outer pipe separately, and a block protruded from an end of the telescopic pipe is provided for retracting the telescopic pipe inwardly or moving the telescopic pipe outwardly to a limit position, and the block will touch each switch to stop driving the electric motor, so as to achieve the effect of controlling and operating the linear actuator to the limit of the stroke.

However, although the aforementioned structure can achieve the effect of controlling and operating the linear actuator to the limit of the stroke, yet the switch is installed inside the outer pipe, so that the outer pipe must come with a special space for accommodating each switch, and thus not only causing a higher level of difficulty for manufacturing the outer pipe, but also incurring a higher material cost. Furthermore, each switch is installed at both ends in the outer pipe separately, such that most parts of the linear actuator must be removed for the maintenance and repair of a damaged component, and thus making the maintenance and repair work more difficult and inconvenient. For linear actuators with a special shape or specification, the aforementioned conventional stroke-restricting device cannot be installed or applied. Obviously, the conventional stroke-restricting device requires improvements.

SUMMARY OF THE INVENTION

Therefore, it is a primary objective of the present invention to provide a stroke-restricting device of a linear actuator. With the structure of each component, only a small space is required for controlling a limit position of a long distance.

To achieve the foregoing objective, the present invention provides a stroke-restricting device of a linear actuator, and the linear actuator comprises a base and a telescopic pipe, and the stroke-restricting device comprises a box, a movable member, a block, a pair of switches, and a wire-reeling mechanism, wherein the box is fixed to the base, and the box has a wall plate and a through hole formed on the wall plate; the movable member includes a rod passed through and coupled to the through hole and capable of moving the box; the block is fixed to the rod; the pair of switches are fixed to the box and at positions corresponding to the block, and each of the switches has a trigger portion provided for contacting the block to generate an electrical signal, and the trigger portions are disposed at two opposite ends of a moving path of the block respectively; and the wire-reeling mechanism is installed at the telescopic pipe and moved together with the telescopic pipe, and the wire-reeling mechanism includes a wire, and an end of the wire is coupled to the movable member; thereby, if the telescopic pipe is retracted inwardly to a limit position, the rod and the block will be pushed and moved together, and the block will touch one of the trigger portions to stop retracting the telescopic pipe; and if the telescopic pipe is extended outwardly to a limit position, the wire will pull and move the rod and the block together, and the block will touch the other trigger portion to stop moving the telescopic pipe.

Another objective of the present invention is to provide a wire-reeling mechanism of a linear actuator capable of reeling the wire to prevent a loosened wire to be wound around internal components.

To achieve the foregoing objective, the present invention provides a wire-reeling mechanism of a linear actuator, and the stroke-restricting device comprises a movable member, and the wire-reeling mechanism comprises a base, a reel wheel, a volute spring and a wire, wherein the base has a protruding pillar extended from the base; the reel wheel is pivotally coupled to the protruding pillar; the volute spring has an end fixed to the protruding pillar and the other end coupled to the reel wheel; and the wire has both ends fixed to the reel wheel and the linear actuator respectively; and the reel wheel is elastically actuated by the volute spring for rotating the reel wheel to reel the wire.

The present invention further has the following effects and adopts the oblique planes of the block to touch the trigger portion, so as to move a maximum distance in the smallest space and achieve the overall miniaturized structure. With the installation of the position-restoring spring, the position-restoring spring can be restored to its central position automatically after external forces are released from the block. The wire-reeling mechanism is provided for reeling the wire automatically when no force is acted onto the reel wheel, so as to prevent winding or pulling out internal components. By adjusting the screw passed and coupled to the end plate of the telescopic pipe, users can externally fine tune the moving path of the telescopic pipe.

DESCRIPTION OF THE PREFERRED EMBODIMENTS

The technical characteristics and contents of the present invention will become apparent with the following detailed description and related drawings. The drawings are provided for the purpose of illustrating the present invention only, but not intended for limiting the scope of the invention.

Figure 1:
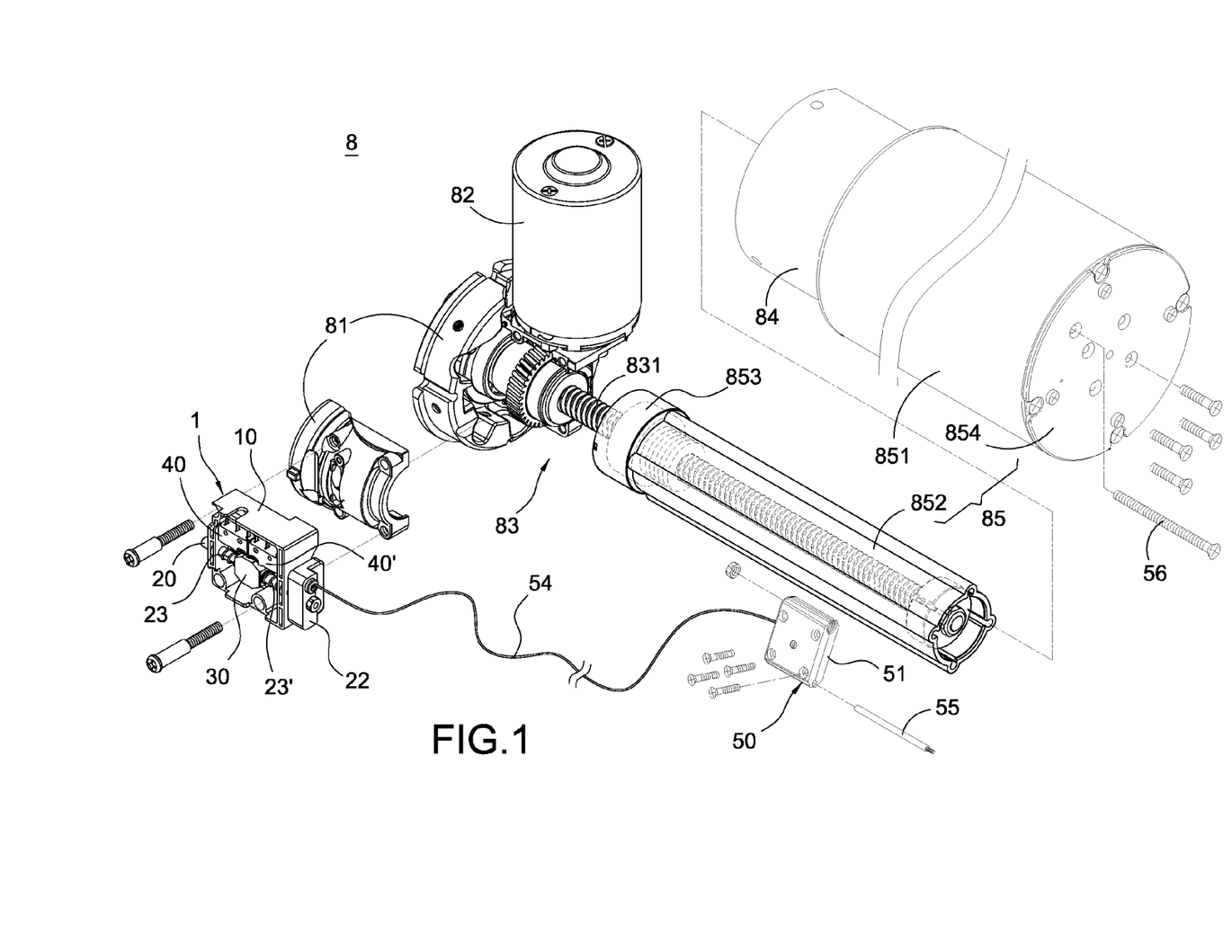
FIG. 1 is a perspective exploded view of a stroke-restricting device used for a linear actuator in accordance with the present invention.

With reference to FIG. 1 for a stroke-restricting device of a linear actuator and a wire-reeling mechanism thereof in accordance with the present invention, the stroke-restricting device 1 comprises a box 10, a movable member 20, a block 30, a pair of switches 40, 40' and a wire-reeling mechanism 50.

Figure 2:
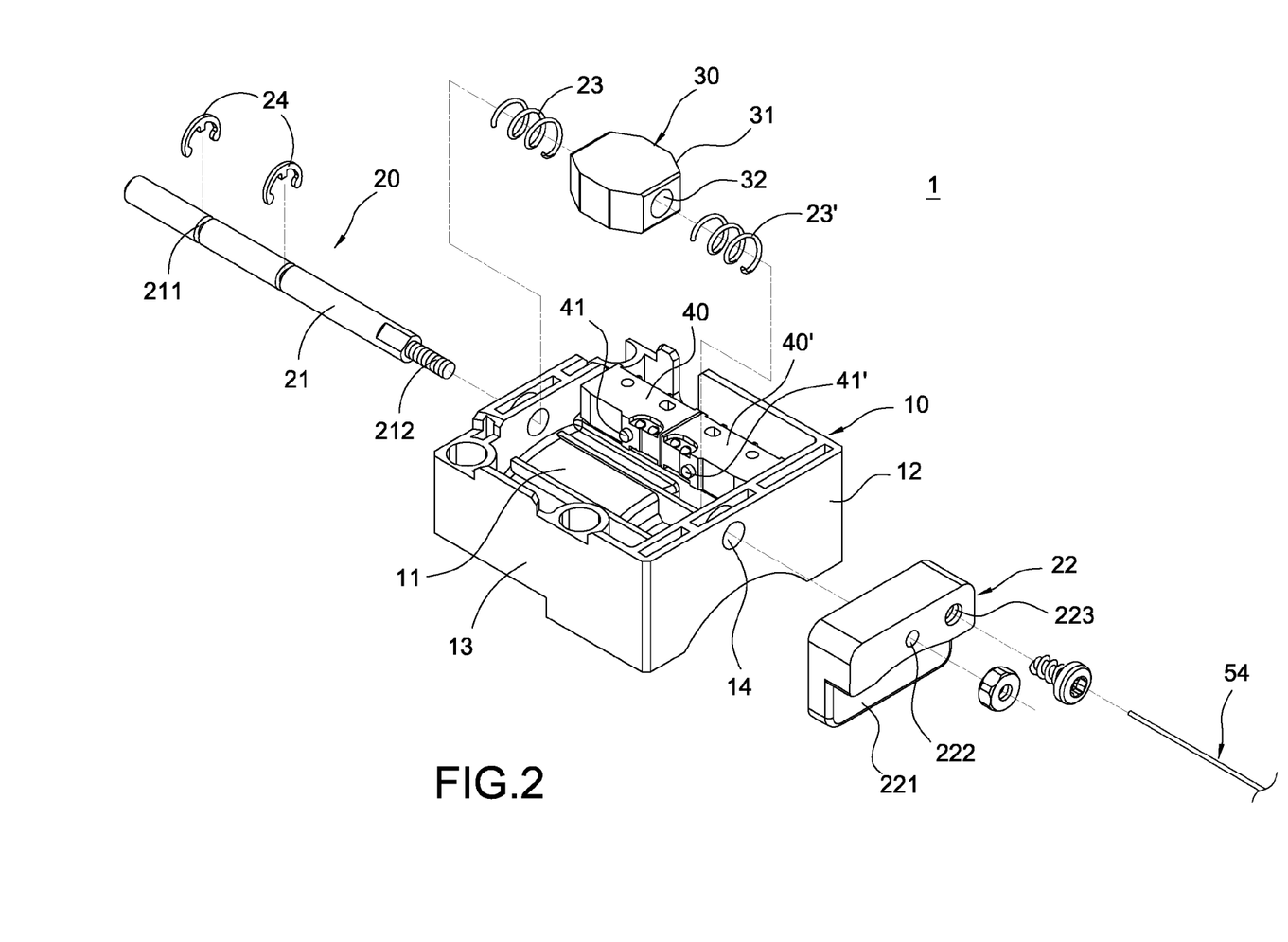
FIG. 2 is a perspective exploded view of a stroke-restricting device in accordance with the present invention.

With reference to FIG. 2, the box 10 is made of a plastic material and comprised of a bottom plate 11, and a pair of wall plates 12 and a pair of side plates 13 extended upwardly and respectively from the edges of the bottom plate 11, and each wall plate 12 is coupled with each respective side plate 13, and each wall plate 12 includes a corresponding through hole 14.

The movable member 20 includes a rod 21 and a stop member 22, wherein a pair of slots 211 are formed at the central position of the rod 21 and separated from each other, and a screw thread section 212 is formed at an end of the rod 21, such that the rod 21 can be passed and coupled into the through hole 14 and moved linearly back and forth with respect to the box 10. The stop member 22 is substantially in a cascade shape and has a stop portion 221, a through hole 222 formed at the stop member 22 on a lateral side of the stop portion 221, and a first screw hole 223, and the stop member 22 is sheathed on the rod 21 through the through hole 222 and secured to the screw thread section 212 of the rod 21 by a nut, and the stop member 22 is exposed to the exterior space of the wall plate 12. In addition, the movable member 20 of this preferred embodiment further includes a pair of position-restoring springs 23, 23' elastically clamped between the block 30 and an internal side of the wall plate 12 (as shown in FIG. 1), such that after an external force of the block 30 is released, the positioning restoring springs 23, 23' can be restored to their central position positions.

The block 30 of this preferred embodiment is substantially in an octagonal shape, but the invention is not limited to such shape only. The block 30 has two pairs of oblique planes 31, and a shaft hole 32 formed on and penetrated through the block 30, such that after the block 30 is sheathed on the rod 12 through the shaft hole 32 and a retaining ring 24 is provided for latching the corresponding position of the slot 211, the block 30 fixed to a central position of the rod 21 can be moved together with the rod 21, and the position-restoring springs 23, 23' are elastically clamped between a side of the block 30 and an internal side of the wall plate 12.

Each switch 40, 40' corresponding to the position of the block 30 is fixed into an interior space of the box 10, and each switch 40, 40' has a trigger portion 41, 41' which can be contacted by the block 30 to generate an electrical signal, and each trigger portion 41, 41' is disposed at both front and rear opposite ends of a moving path of the block 21.

Figure 3:
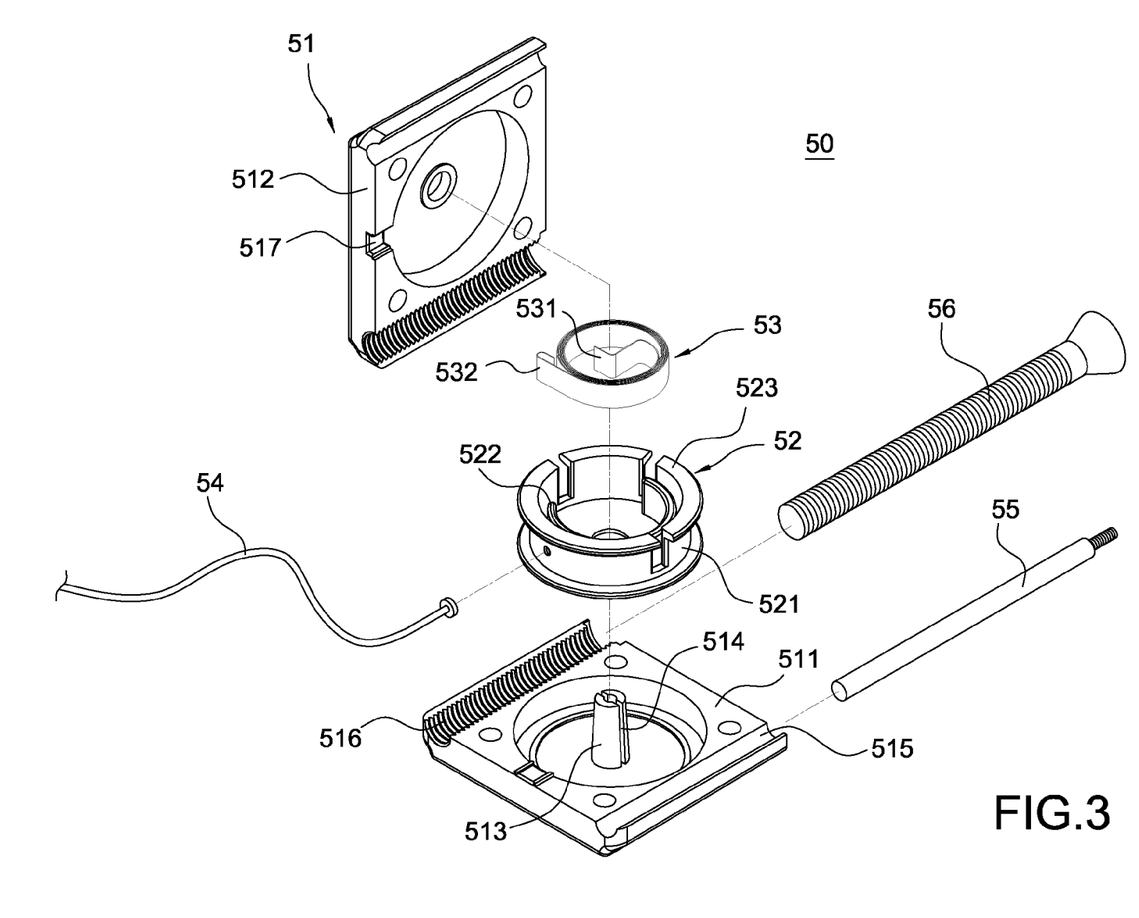
FIG. 3 is a perspective exploded view of a wire-reeling mechanism in accordance with the present invention.
Figure 4:
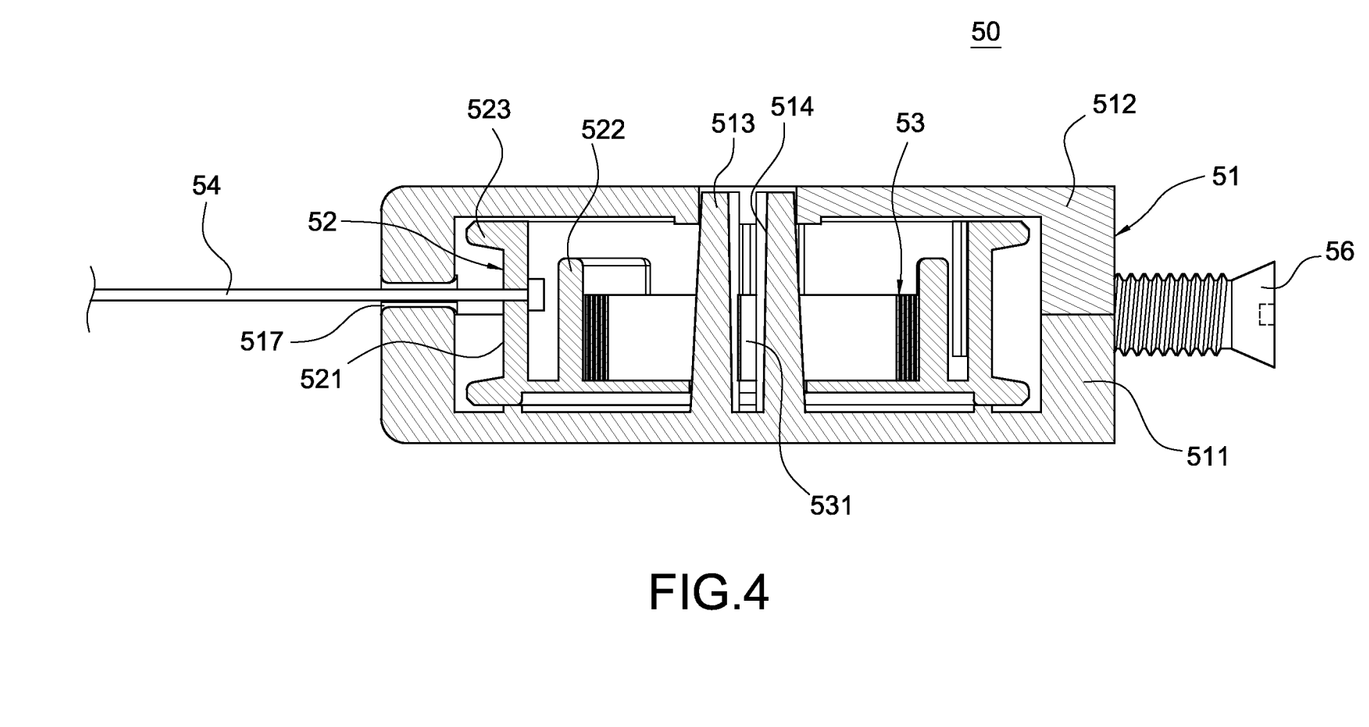
FIG. 4 is a cross-sectional view of a wire-reeling mechanism in accordance with the present invention.

With reference to FIGS. 3 and 4, the wire-reeling mechanism 50 comprises a base 51, a reel wheel 52, a volute spring 53 and a wire 54, and the base 51 is comprised of a lower casing plate 511 and an upper casing plate 512, wherein a protruding pillar 513 is extended form the central position of the lower casing plate 511, and a cut groove 514 is formed at the central position of the protruding pillar 513, and the upper casing plate 512 and the lower casing plate 511 are fixed together by a screw fixture element such as a screw, and a pillar hole 515 and a screw hole 516 are formed on both sides of the base 51 respectively, and the base 51 includes a wire threading hole 517 formed at the corresponding protruding pillar 513.

The reel wheel 52 is pivotally coupled to the protruding pillar 513 and accommodated in the base 51, and the reel wheel 52 is comprised of an outer wheel 521 and an inner ring 522 separated and formed in the interior space of the outer wheel 521, and a flange 523 is extended separately up and down from the edge of the outer wheel 521 for preventing the wire 54 from falling out from the outer wheel 521, and the inner ring 522 is comprised of three arc plates.

The volute spring 53 is formed by bending and curling a metal plate, and the volute spring 53 has an insert portion 531 formed at the central position of the volute spring 53 and a hook portion 532 formed at an edge of the external periphery. The volute spring 53 is installed in the interior space of the inner ring 522, and the insert portion 531 is passed and fixed into the cut groove 514 of the protruding pillar 513, and the hook portion 532 is hooked onto the inner ring 522.

An end of the wire 54 is passed into the wire threading hole 517 and fixed onto the reel wheel 52, and the other end of the wire 54 is screwed to the first screw hole 223 through the screw and fixed onto the stop member 22 (as shown in FIG. 1).

Figure 5:
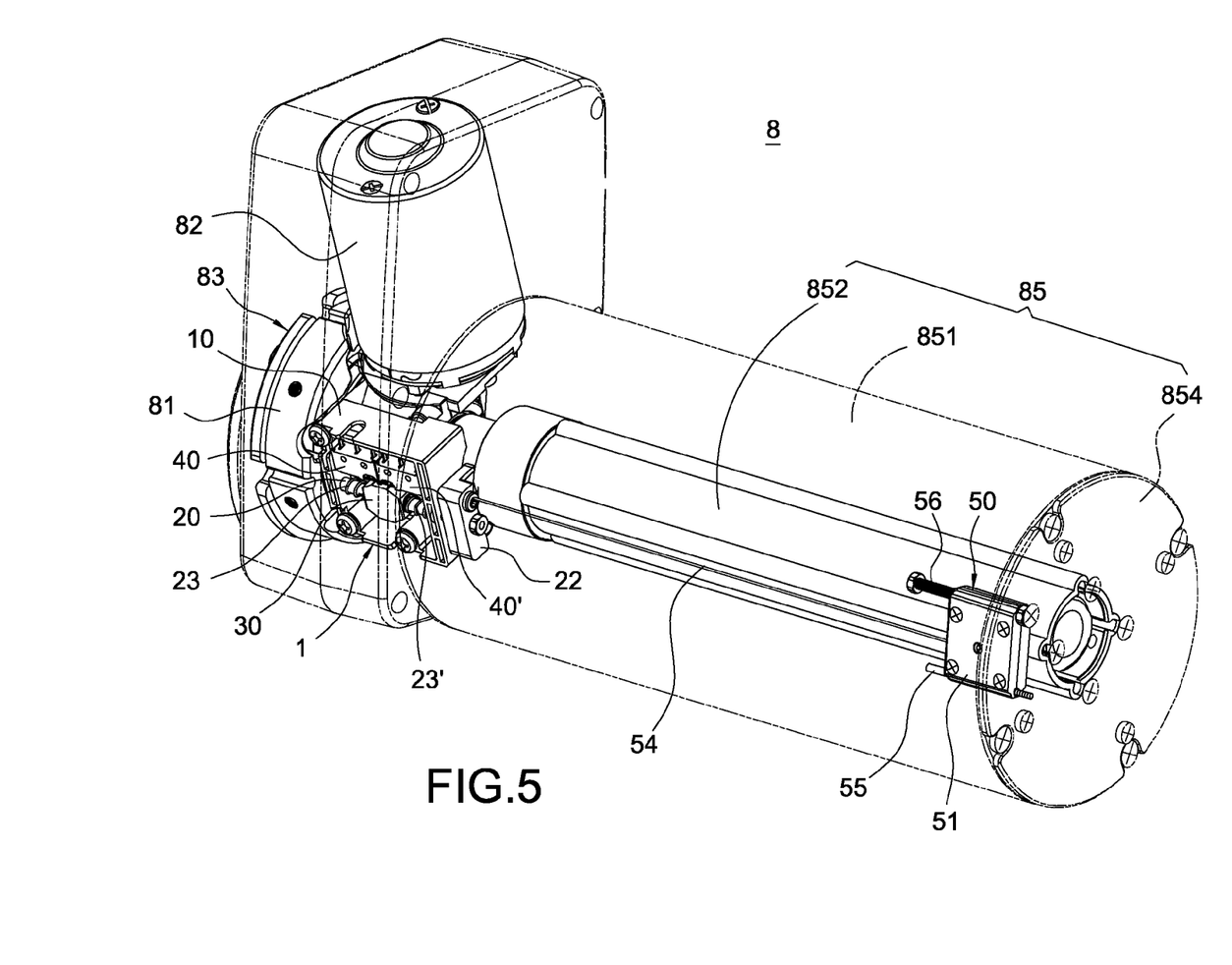
FIG. 5 is a schematic view of a stroke-restricting device used for a linear actuator in accordance with the present invention.
Figure 6:
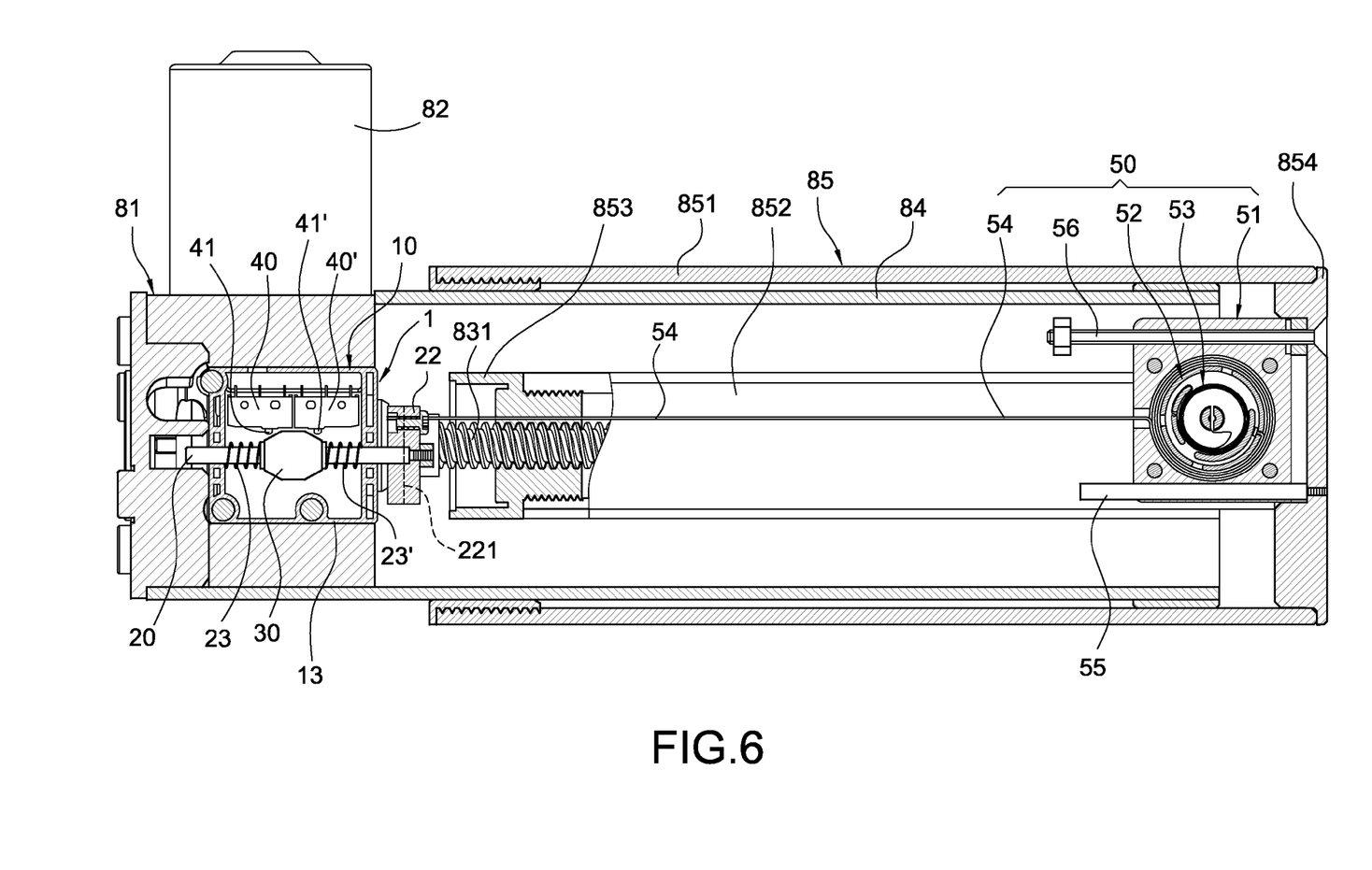
FIG. 6 is a cross-sectional view of a stroke-restricting device used for a linear actuator in accordance with the present invention.

With reference to FIGS. 5 and 6 for a linear actuator 8 applied to a stroke-restricting device 1 in accordance with the present invention, the linear actuator 8 comprises a base 81, an electric motor 82, a transmission mechanism 83, a fixed pipe 84 and a telescopic pipe 85 (as shown in FIG. 1), and the electric motor 82 and the fixed pipe 84 are fixed onto the base 81 and arranged substantially in an L-shape. The transmission mechanism 83 includes a lead screw 831, and an end of the lead screw 831 is installed in the base 81 and driven and rotated by an electric motor 82 through a worm gear set. The telescopic pipe 85 includes an inner pipe 851 and an outer pipe 852, and the outer pipe 852 is sheathed on the external periphery of the fixed pipe 84, and the inner pipe 851 includes a nut 853 screwed and transmitted with the lead screw 831 and installed in the interior space of the fixed pipe 84, and the inner pipe 851 and the outer pipe 852 are fixed and linked with each other through an end plate 854. During assembling, a bolt is passed through the box 10 and fixed onto the base 81 (as shown in FIG. 1), and each switch 40, 40' is electrically coupled to an electric motor 82 (not shown in the figure).

With reference to FIGS. 3 and 6, the wire-reeling mechanism 50 of the present invention further comprises a guide pillar 55 and an adjusting screw 56, and an end of the guide pillar 55 is fixed to the end plate 854 of the telescopic pipe 85, and the other end of the guide pillar 55 is passed out from the pillar hole 515, and the adjusting screw 56 and the guide pillar 55 are installed in parallel to each other. The adjusting screw 56 is passed through the end plate 854 of the telescopic pipe 85 and screwed into the screw hole 516 of the base 51 in order to externally fine tune the moving path of the telescopic pipe 85.

Figure 7:
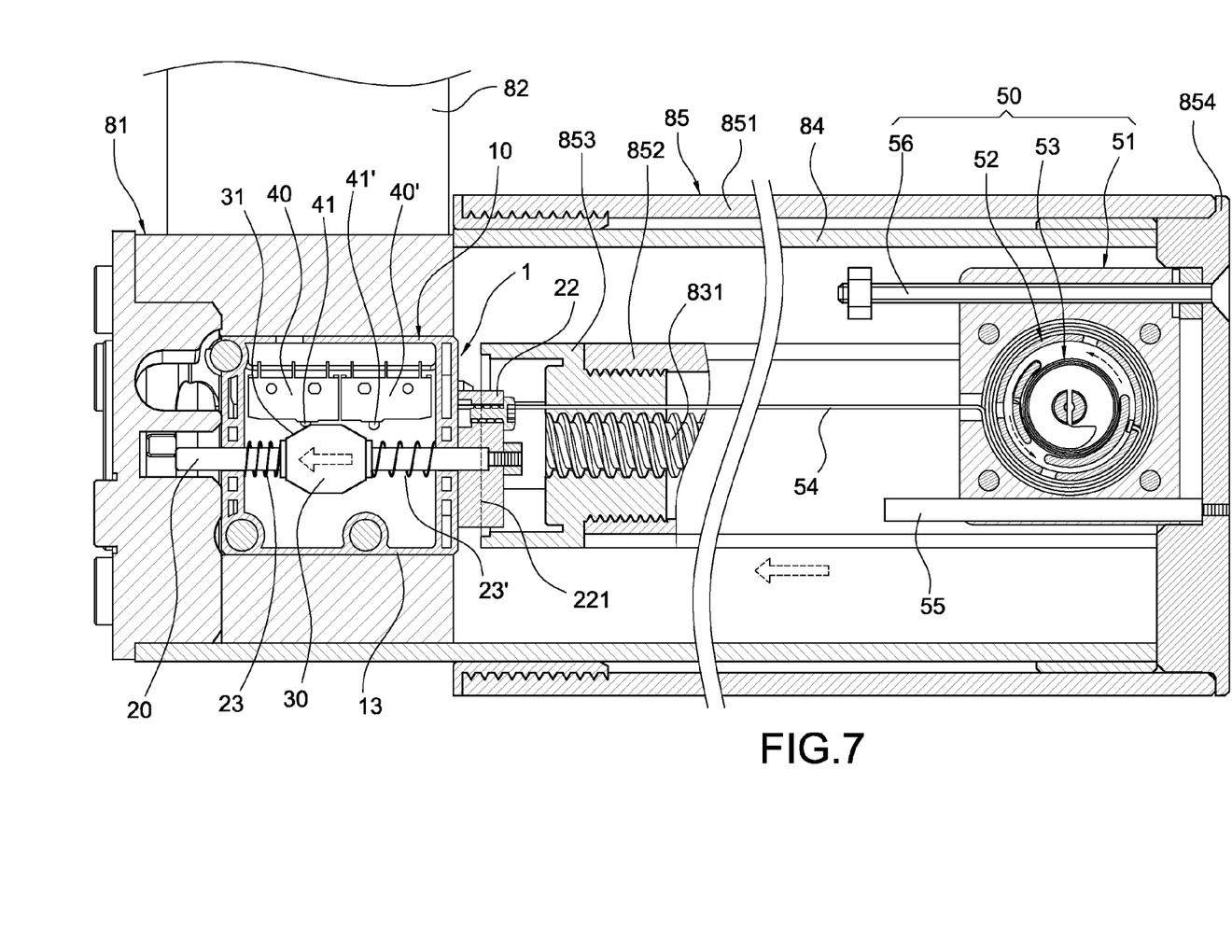
FIG. 7 is a first schematic view of using a stroke-restricting device of a linear actuator in accordance with the present invention.

With reference to FIG. 7, when the telescopic pipe 85 is retracted inwardly for the use, the reel wheel 52 is elastically actuated by the volute spring 53, such that the reel wheel 52 can rotate counterclockwise to reel the wire 54. When the telescopic pipe 85 is retracted inwardly to a limit position, an end of a nut 853 is used for pressing and moving the stop portion 221 of the stop member 22, such that the rod 20 drives the block 30 to move together, and the oblique plane 31 at the backside of the block 30 is provided for touching and pressing the trigger portion 41 of the switch 40, so as to stop the operation of the electric motor 82 that is electrically coupled to the switch 40, and stop retracting the telescopic pipe 85.

Figure 8:
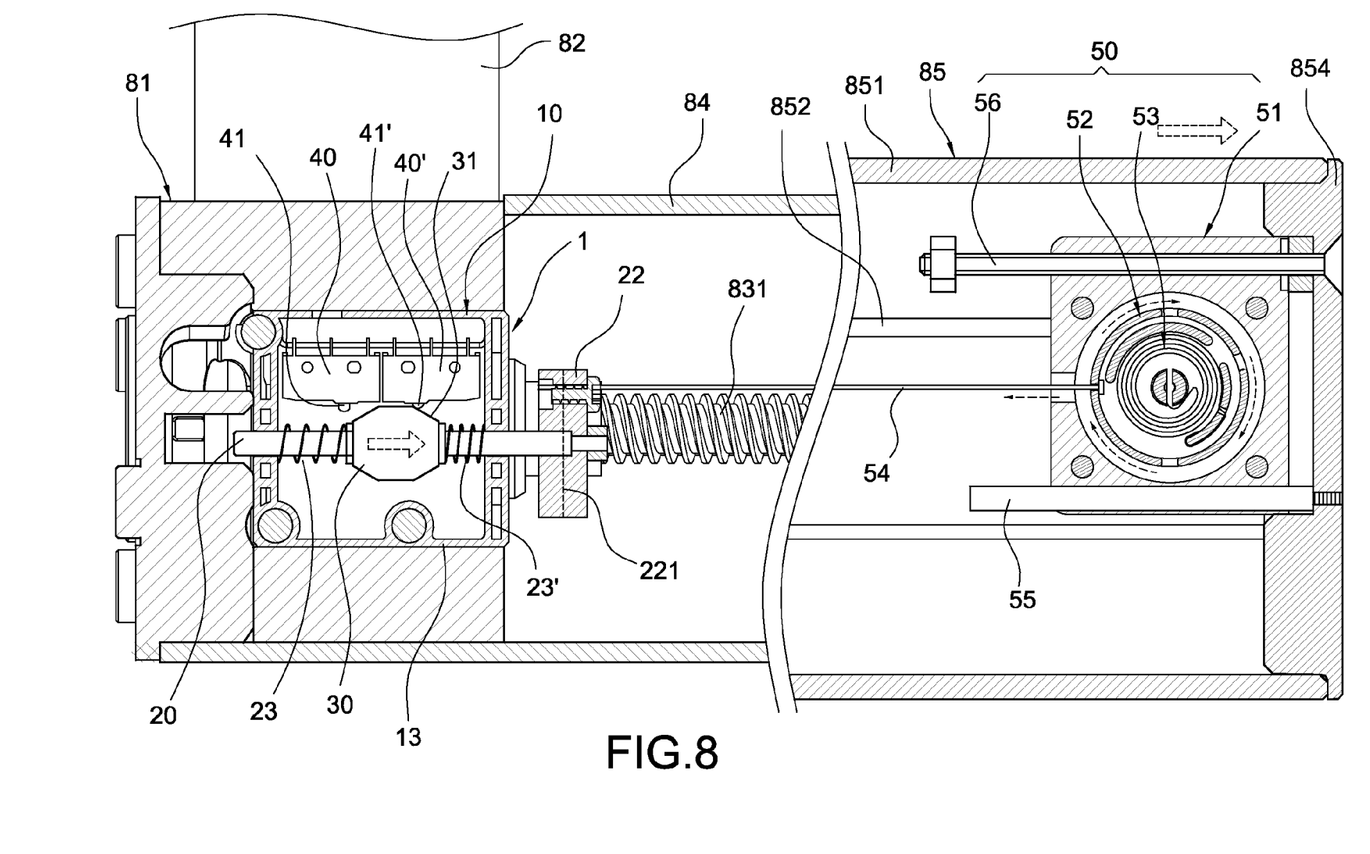
FIG. 8 is a second schematic view of using a stroke-restricting device of a linear actuator in accordance with the present invention.

With reference to FIG. 8, when the telescopic pipe 85 is extended outwardly, the wire-reeling mechanism 50 is fixed onto the end plate 854 of the telescopic pipe 85 to move towards the outside together with the telescopic pipe 85. Now, the reel wheel 52 is pulled by the wire 54 to rotate clockwise to release the wire 54. When the telescopic pipe 85 is extended outwardly to a limit position, the wire 54 is fully extended. After the telescopic pipe 85 keeps on moving outward, the wire 50 pulls the rod 20 and the block 30 to move outwardly together, and the oblique plane 31 at the front of the block 30 will touch and press the trigger portion 41' of the switch 40', so as to stop the operation of the electric motor 82 which is electrically coupled to the switch 40' and stop moving the telescopic pipe 85 outward.

In summation of the description above, the stroke-restricting device of the linear actuator and the wire-reeling mechanism thereof in accordance with the present invention improves over the prior art and complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A stroke-restricting device of a linear actuator, and the linear actuator comprising a base and a telescopic pipe, and the stroke-restricting device comprising:
    a box, fixed to the base, and the box having a wall plate, and a through hole formed on the wall plate;
    a movable member, including a rod passed through and coupled to the through hole, and capable of moving the box;
    a block, fixed to the rod;
    a pair of switches, fixed to the box and at positions corresponding to the block, and each of the switches having a trigger portion provided for contacting the block to generate an electrical signal, and the trigger portions being disposed at two opposite ends of a moving path of the block respectively; and
    a wire-reeling mechanism, installed at the telescopic pipe, and moved with the telescopic pipe, and the wire-reeling mechanism including a wire, and an end of the wire being coupled to the movable member;
    wherein, when the telescopic pipe is retracted inwardly to a limit position, the rod and the block are pushed and moved together, and the block will touch one of the trigger portions to stop retracting the telescopic pipe; and when the telescopic pipe is extended outwardly to a limit position, the wire pulls and moves the rod and the block together, and the block will touch the other trigger portion to stop moving the telescopic pipe.

2. The stroke-restricting device of a linear actuator as recited in claim 1, wherein the movable member further comprises a stop member coupled to the rod and formed outside the box, and the stop member includes a stop portion for retracting and pressing the telescopic pipe.

3. The stroke-restricting device of a linear actuator as recited in claim 1, wherein the rod includes a pair of slots formed thereon, and the block includes a shaft hole for sheathing the rod, and a retaining ring for latching the slot and positioning the block.

4. The stroke-restricting device of a linear actuator as recited in claim 1, wherein the block includes a pair of oblique planes provided for contacting and pressing the trigger portion by the oblique planes.

5. The stroke-restricting device of a linear actuator as recited in claim 1, wherein the movable member further includes a pair of position-restoring springs elastically clamped between the block and the wall plate.

6. The stroke-restricting device of a linear actuator as recited in claim 1, wherein the wire-reeling mechanism further includes a base, a reel wheel and a volute spring, and the base is installed at the telescopic pipe, and a protruding pillar is extended from the base, and the reel wheel is pivotally coupled to the protruding pillar, and an end of the volute spring is fixed to the protruding pillar, and another end of the volute spring is coupled to the reel wheel, and the wire is provided for winding and reeling the reel wheel.

7. The stroke-restricting device of a linear actuator as recited in claim 6, wherein the base includes a lower casing plate and an upper casing plate coupled to the lower casing plate, and the protruding pillar is extended out from the lower casing plate, and the reel wheel is accommodated in the upper casing plate and the lower casing plate.

8. The stroke-restricting device of a linear actuator as recited in claim 7, wherein the base has a wire threading hole, and the wire is passed into the wire threading hole and fixed onto the movable member.

9. The stroke-restricting device of a linear actuator as recited in claim 6, further comprising an adjusting screw, and the base having a screw hole, and the telescopic pipe having an end plate, and the adjusting screw being passed through the end plate and screwed into the screw hole.

10. The stroke-restricting device of a linear actuator as recited in claim 9, further comprising a guide pillar, the base having a pillar hole, and an end of the guide pillar being fixed to the end plate, and the other end of the guide pillar being passed through the pillar hole, and the adjusting screw and the guide pillar being installed in parallel to each other.

11. The stroke-restricting device of a linear actuator as recited in claim 6, wherein the protruding pillar has a cut groove, and the reel wheel includes an inner ring, and the volute spring has an insert portion formed at a central position of the volute spring and a hook portion formed at an outer periphery of the volute spring, and the insert portion is passed into the cut groove and fixed, and the hook portion is hooked onto the inner ring.

12. The stroke-restricting device of a linear actuator as recited in claim 11, wherein the reel wheel further includes an outer wheel formed at the exterior of the inner ring and provided for winding the wire, and the outer wheel includes a flange extended separately upward and downward from the outer wheel.

13. A wire-reeling mechanism of a linear actuator, the linear actuator including a telescopic pipe and the telescopic pipe having an end plate, comprising:
    a base, having a screw hole and a protruding pillar extended from the base;
    an adjusting screw, passed through the end plate and screwed into the screw hole;
    a reel wheel, pivotally coupled to the protruding pillar;
    a volute spring, with an end fixed to the protruding pillar and the other end coupled to the reel wheel; and
    a wire, with both ends fixed to the reel wheel and the linear actuator respectively;

wherein, the reel wheel is elastically actuated by the volute spring for rotating the reel wheel to reel the wire.

14. The wire-reeling mechanism of a linear actuator as recited in claim 13, wherein the base includes a lower casing plate and an upper casing plate coupled to the corresponding lower casing plate, and the protruding pillar is extended out from the lower casing plate, and the reel wheel is accommodated in the upper casing plate and the lower casing plate.

15. The wire-reeling mechanism of a linear actuator as recited in claim 14, wherein the base has a wire threading hole, and the wire is passed into the wire threading hole and fixed onto the reel wheel.

16. The wire-reeling mechanism of a linear actuator as recited in claim 13, further comprising a guide pillar, and the base having a pillar hole, and an end of the guide pillar being fixed to the end plate, and the other end being passed into the pillar hole, and the adjusting screw and the guide pillar being installed in parallel to each other.

17. The wire-reeling mechanism of a linear actuator as recited in claim 13, wherein the protruding pillar has a cut groove, and the reel wheel includes an inner ring, and the volute spring has an insert portion formed at a central position of the volute spring and a hook portion formed at an outer periphery of the volute spring, and the insert portion is passed into the cut groove and fixed, and the hook portion is hooked onto the inner ring.

18. The wire-reeling mechanism of a linear actuator as recited in claim 17, wherein the reel wheel further includes an outer wheel formed at the exterior of the inner ring and provided for winding the wire, and the outer wheel includes a flange extended separately upward and downward from the outer wheel.

\* \* \* \* \*